Patented Dec. 6, 1932

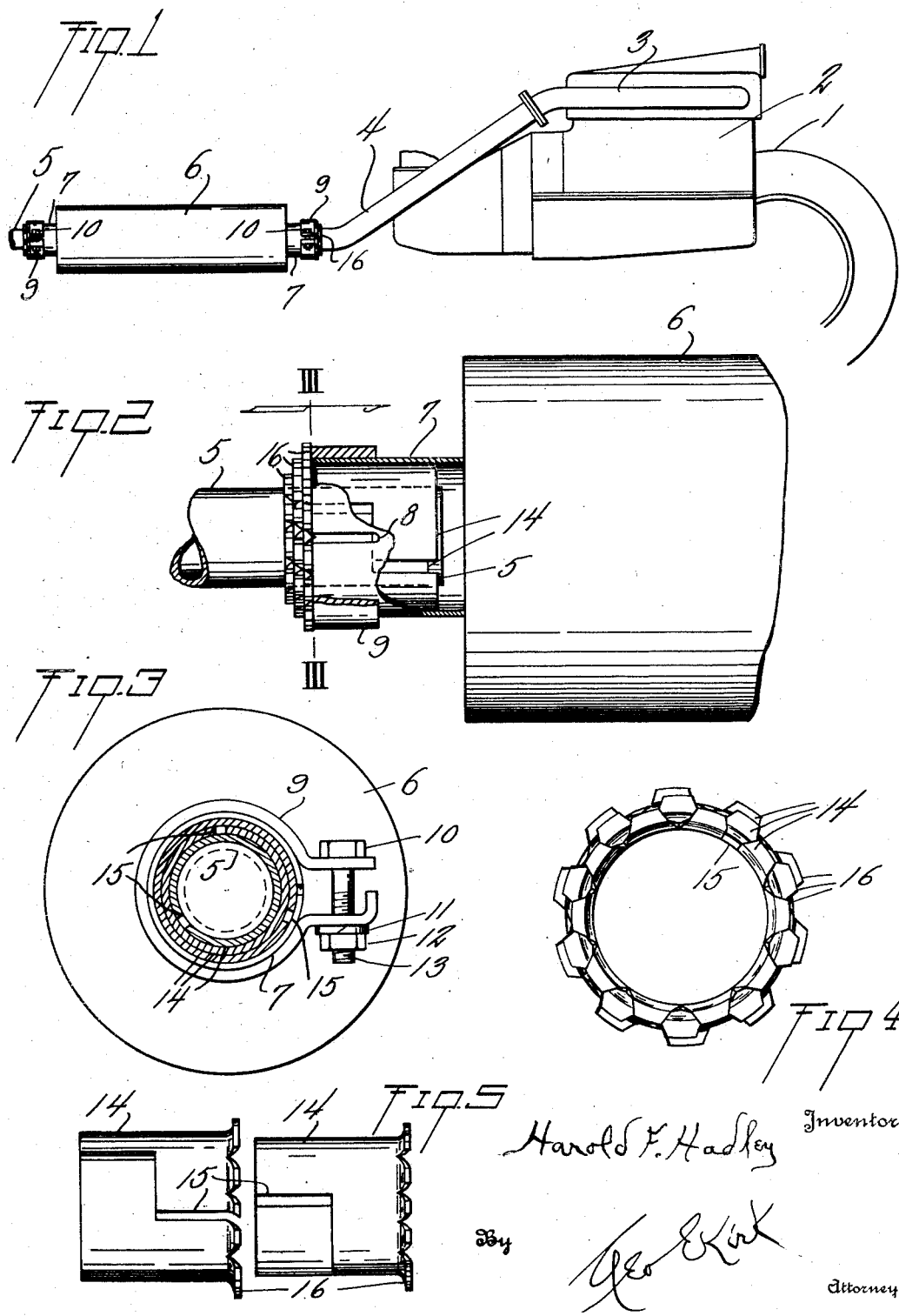

1,890,151

UNITED STATES PATENT OFFICE

HAROLD F. HADLEY, OF TOLEDO, OHIO, ASSIGNOR TO ASSOCIATED PARTS, INC., OF TOLEDO, OHIO, A CORPORATION OF OHIO

MUFFLER MOUNTING     REISSUED

Application filed May 3, 1930. Serial No. 449,516.

This invention relates to mufflers and muffler assembly.

This invention has utility when incorporated in compact multiple-diameter muffler assembly with exhaust or tail pipes or both.

Referring to the drawing:

Fig. 1 is a fragmentary view of an embodiment of the invention as a muffler for an internal combustion motor of a motor vehicle;

Fig. 2 is a detail view on an enlarged scale, parts being broken away, of the assembly feature;

Fig. 3 is a view on the line III—III, Fig. 2;

Fig. 4 is an end elevation of a nest of the sections; and

Fig. 5 is a distributed view of a two-group nest of the sections.

Motor vehicle 1 is shown having internal combustion motor 2 with exhaust manifold 3 having exhaust pipe 4 therefrom with tail pipe 5 and muffler 6 interposed therebetween. This muffler 6 is shown as having terminal throats 7 with kerf 8 in each thereof embraced by split collar 9 to be drawn up by bolt 10 having spring washer 11 and nut 12 on threaded portion 13 of the bolt 10. This bolt is accordingly effective to collapse the throat 7 toward the pipe 4 or 5 in the substantial assembly therewith.

There is quite a range of sizes for the pipes 4 and 5 in motor vehicle practice. This muffler 6 is of universal application due to the adapter assembly herein disclosed involving nest of bushings 14 of one piece circumferentially provided with step split 15 rendering such collapsible. Furthermore, terminal flange in the form of wings or prongs 16 provides a decorative feature as well as utility in that the muffler 6 when supplied to the dealer has assembled therein the nest of these bushing sections.

The garage man or one making the assembly has the muffler 6 in position to slip over the pipe 4 and in the event the pipe 4 be too large, an edged tool as a screw driver may be thrust back of a wing 16 of the inner bushing to slip such out and thus give the next larger dimension for the adapter interior. When this dimension closely approximates the external diameter of the pipe, it may be thrust thereon for slight frictional gripping due to the taper at the flange region or it may even have an easy slip fit.

The various bushing sections 14 as nesting together have the steps 15 slightly open in their normal position and the steps staggered as to each other, thereby providing a sealed coupling. With the pipe thrust into the throat through the bushing sections, tightening of the nut 12 on the bolt 10 may effect such frictional clamping at this collar 9 so as not only to make the assembly tight against whistling or singing from gas or air blowing, but for substantially positioning or mounting the muffler between the pipes. There is accordingly provided herein a universal muffler of compact type for a plurality of diameters of exhaust and tail pipes, which muffler may be readily installed over a range of sizes for the pipes whether similar or dissimilar.

What is claimed and it is desired to secure by Letters Patent is:

In a nest of bushing sections comprising sheet metal rolls of split ring form, said rolls terminally having a toothed flange forming a rim for each thereof, said rims in nesting assembly of the sections being in abutting relation for imparting arc flexibility to the separate rings, and the teeth of the successive rims providing abutment means adapted to be engaged by a tool for effecting ready relative shifting between the rings.

In witness whereof I affix my signature.

HAROLD F. HADLEY.